(12) United States Patent
Leffler (10) Patent No.: US 6,966,996 B2
(45) Date of Patent: Nov. 22, 2005

(54) METHOD AND SYSTEM FOR DESALINATING WATER

(75) Inventor: Charles E. Leffler, Lake Worth, FL (US)

(73) Assignee: Eaglestone Investment Partners I, L.P. Tesla Capital LLC, Duxbury, MA (US)

( * ) Notice: Subject to any disclaimer, the term of this patent is extended or adjusted under 35 U.S.C. 154(b) by 164 days.

(21) Appl. No.: 10/660,068

(22) Filed: Sep. 11, 2003

(65) Prior Publication Data

US 2004/0159615 A1 Aug. 19, 2004

Related U.S. Application Data

(60) Provisional application No. 60/409,979, filed on Sep. 12, 2002, and provisional application No. 60/426,803, filed on Nov. 18, 2002.

(51) Int. Cl.[7] ............................. C02F 1/467; C02F 1/50
(52) U.S. Cl. ...................... 210/748; 210/192; 210/205; 422/186.04
(58) Field of Search ................................. 210/703, 748, 210/753, 754, 192, 198.1, 205, 222; 422/29, 186.01, 186.04; 204/554, 660

(56) References Cited

U.S. PATENT DOCUMENTS

| | | |
|---|---|---|
| 3,945,918 A | 3/1976 | Kirk |
| 3,959,131 A | 5/1976 | Ramirez et al. |
| 4,248,681 A | 2/1981 | Sweeney |
| 4,248,715 A | 2/1981 | Olivier |
| 4,256,552 A | 3/1981 | Sweeney |
| 4,358,058 A | 11/1982 | Bierman |
| 4,361,471 A | 11/1982 | Kosarek |
| 4,525,243 A | 6/1985 | Miller |
| 4,563,286 A | 1/1986 | Johnson et al. |
| 5,443,719 A | 8/1995 | Johnson et al. |
| 5,538,631 A | 7/1996 | Yeh |
| 5,549,800 A | 8/1996 | Iwata |
| 5,597,479 A | 1/1997 | Johnson |
| 5,616,250 A | 4/1997 | Johnson et al. |
| 5,622,622 A | 4/1997 | Johnson |
| 5,635,059 A | 6/1997 | Johnson |
| 5,674,312 A | 10/1997 | Mazzei |
| 5,685,994 A | 11/1997 | Johnson |
| 5,728,303 A | 3/1998 | Johnson |
| 5,792,369 A | 8/1998 | Johnson |
| 5,840,159 A | 11/1998 | Rosenblad |
| 5,958,229 A | 9/1999 | Filiopoulos et al. |
| 6,277,288 B1 | 8/2001 | Gargas |
| 6,517,713 B2 | 2/2003 | Gargas |
| 6,551,518 B2 | 4/2003 | Gargas |
| 6,740,245 B2 | 5/2004 | Johnson |
| 2002/0170816 A1 | 11/2002 | Lettler et al. |
| 2004/0099607 A1 | 5/2004 | Leffler et al. |
| 2004/0099608 A1 | 5/2004 | Leffler et al. |
| 2004/0206680 A1 | 10/2004 | Johnson |

*Primary Examiner*—Frank M. Lawrence (57) ABSTRACT

A desalination system for removing at least a substantial amount of salt from a saltwater. In at least one embodiment, the desalination system may inject the saltwater with one or more ionized gases for removing contaminants from the saltwater. The desalination system may include one or more ionized gas generators for generating one or more ionized gases to be mixed with the saltwater. The desalination system may inject a disinfectant into the saltwater to disinfect the saltwater. The desalination system may generate one or more disinfectants from saltwater using a disinfectant generator. In at least one embodiment, the disinfectant generator may separate disinfectants from saltwater using electrolysis.

34 Claims, 12 Drawing Sheets

FIGURE 14 ations. This application claims the benefit of U.S. Provisional
METHOD AND SYSTEM FOR DESALINATING WATER

CROSS REFERENCE TO RELATED APPLICATIONS

This application claims the benefit of U.S. Provisional Application No. 60/409,979, filed Sep. 12, 2002 and the benefit of U.S. Provisional Application No. 60/426,803, filed Nov. 18, 2002.

FIELD OF THE INVENTION

The invention relates generally to desalination systems, and more particularly, to a system and method for desalinating water having been injected with ionized gases.

BACKGROUND OF THE INVENTION

Desalination systems have been in use for quite some time for removing salt from saltwater to produce potable water. Such systems often pass saltwater through one or more filters for removing salt, heat and condense saltwater to remove the salt, or through other processes. For example, some desalination systems use heating elements to vaporize saltwater and condense the water vapor to form desalinated water. Such devices often require a large amount of energy to vaporize the water and thus, often are costly to operate.

In another device, vacuum chambers have been used to facilitate vaporization of the desalinated water by inducing boiling of the saltwater at a lower temperature than saltwater at one atmosphere of pressure. Such devices, however, are often plagued with operation problems. More specifically, it is often difficult to provide a continuous flow system having an inlet for saltwater and an outlet for condensation while simultaneously providing a chamber having negative pressure. While these processes have been successful in removing salt from saltwater, each process has disadvantages. Thus, there exists a need for a more efficient desalination system.

SUMMARY OF THE INVENTION

This invention is directed to a desalination system for removing a substantial portion of salt from a water containing salt. The desalination system may be adapted to be fitted onto a vessel to desalinate saltwater drawn from the water body in which the vessel may be floating. The desalination system may be configured to separate contaminants, such as salt and other materials, from the water and return the contaminants and other materials to the water body from which the saltwater was drawn. In general, the desalination system mixes one or more ionized gases with saltwater to kill living organisms suspended in the saltwater. In addition, the desalination system may mix one or more disinfectants with the saltwater to further kill living organisms and to facilitate separation of the salt from the water. The desalination system may, in at least one embodiment, generate ionized gases from air or generate disinfectants from saltwater, or both.

In at least one embodiment, the desalination system may include a filter for removing suspended solids, floating debris, and other materials from the saltwater. Downstream of the filter, the desalination system may mix an ionized gas with the saltwater. The desalination system may include one or more mixers for mixing saltwater with one or more ionized gases to produce a mixture of ionized gas and saltwater. The ionized gas may be drawn from a container or from another source, or generated using an ionized gas generator. The ionized gas generator may include one or more ultraviolet (UV) light sources and one or more sources of a magnetic field. In operation, a gas, such as air, may be passed through the ionized gas generator and exposed to UV light, to infrared light, and to one or more magnetic fields. Exposure to UV light and to magnetic fields facilitates ionization of various molecules in air.

The desalination system may also include one or more filters for removing coagulated particles from the mixture of ionized gas and saltwater formed in the mixer. The desalination system may include one or more injectors for injecting one or more disinfectants into the mixture of saltwater and ionized gas to disinfect the mixture of saltwater and ionized gases. The disinfectant may be received from a container or from another source, or may be received from a disinfectant generator. In at least one embodiment, one or more disinfectant generators may be used for generating one or more disinfectants from saltwater, which may be drawn from a water body in which a vessel may be floating. The disinfectant generator may use electrolysis to separate disinfectants, such as, but not limited to, chlorine, bromine, and other such disinfectants from saltwater.

The desalination system may also include one or more reaction chambers for mixing the disinfectant with the mixture of ionized gas and saltwater, wherein salt from the mixture of saltwater and ionized gas is separated to form a salt slurry and the remaining portion of the mixture forms desalinated water. The reaction chamber may include one or more nozzles to for injecting the mixture of saltwater, ionized gas, and disinfectant into the reaction chamber as a fine mist or fog. The fine mist, in combination with the addition of the disinfectant, facilitates separation of the salt from the saltwater.

During operation, saltwater may be injected with an ionized gas in the desalination system. The ionized gas may kill at least a portion of the living organisms in the saltwater. In at least one embodiment, the ionized gas may be injected into the saltwater through a mixer. The ionized gas may be generated by passing air through an ionized gas generator in which the air is exposed to magnetic fields and UV light. The ionized gas may be mixed with saltwater after being generated. The saltwater may then be passed through one or more filters to remove suspended solids, dead organisms, and other contaminants. The mixture of saltwater and ionized gases may then be mixed with one or more disinfectants. The disinfectant may be drawn from a container or drawn from another source, or produced by a disinfectant generator. In at least one embodiment, the disinfectant generator may produce one or more disinfectants from saltwater using electrolysis. The disinfectants may include, but are not limited to, chlorine, bromine, and other materials.

The mixture of saltwater, ionized gas, and disinfectant may be sent to a reaction chamber. More specifically, the mixture may be passed through one or more nozzles and emitted from the nozzles into the reaction chamber. The nozzles may produce a fine mist, which may cause the salt in the saltwater to precipitate out and leave desalinated water, which may be collected in the reaction as well.

These and other embodiments and advantages are described in more detail below.

BRIEF DESCRIPTION OF THE DRAWINGS

The accompanying drawings illustrate embodiments of this invention and, together with the description, disclose various aspects of the invention. These figures include the following.

DETAILED DESCRIPTION OF THE INVENTION

Figure 1:
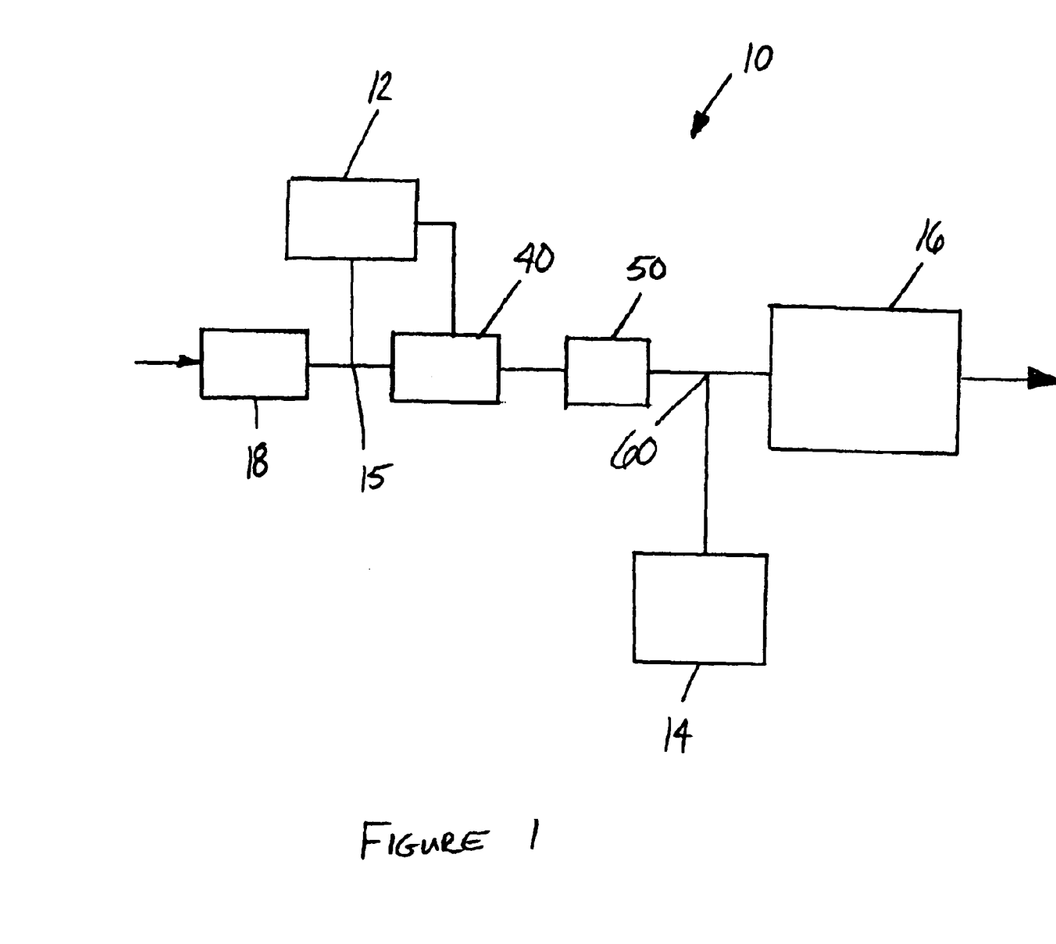
FIG. 1 is a schematic view of the desalination system of this invention.

As shown in FIGS. 1–14, this invention is directed to a desalination system 10 for desalinating saltwater. As shown in FIG. 1, the desalination system 10 may inject a saltwater with one or more ionized gases to facilitate removal of substantially all of the salt from saltwater. The desalination system 10 may also inject one or more disinfectants into the saltwater to disinfect the saltwater. In at least one embodiment, the desalination system 10 may include an ionized gas generator 12 for generating one or more ionized gases. The desalination system 10 may also include a disinfectant generator 14 for generating one or more disinfectants. In at least one embodiment, the disinfectant generator 14 may generate one or more disinfectants from saltwater, such as, but not limited to, chlorine and bromine. The desalination system 10 may also include a reaction chamber 16 for removing salt from saltwater to produce desalinated water. The desalinated water produced by the desalination system 10 may be potable water and may meet or exceed applicable drinking water standards.

Figure 2:
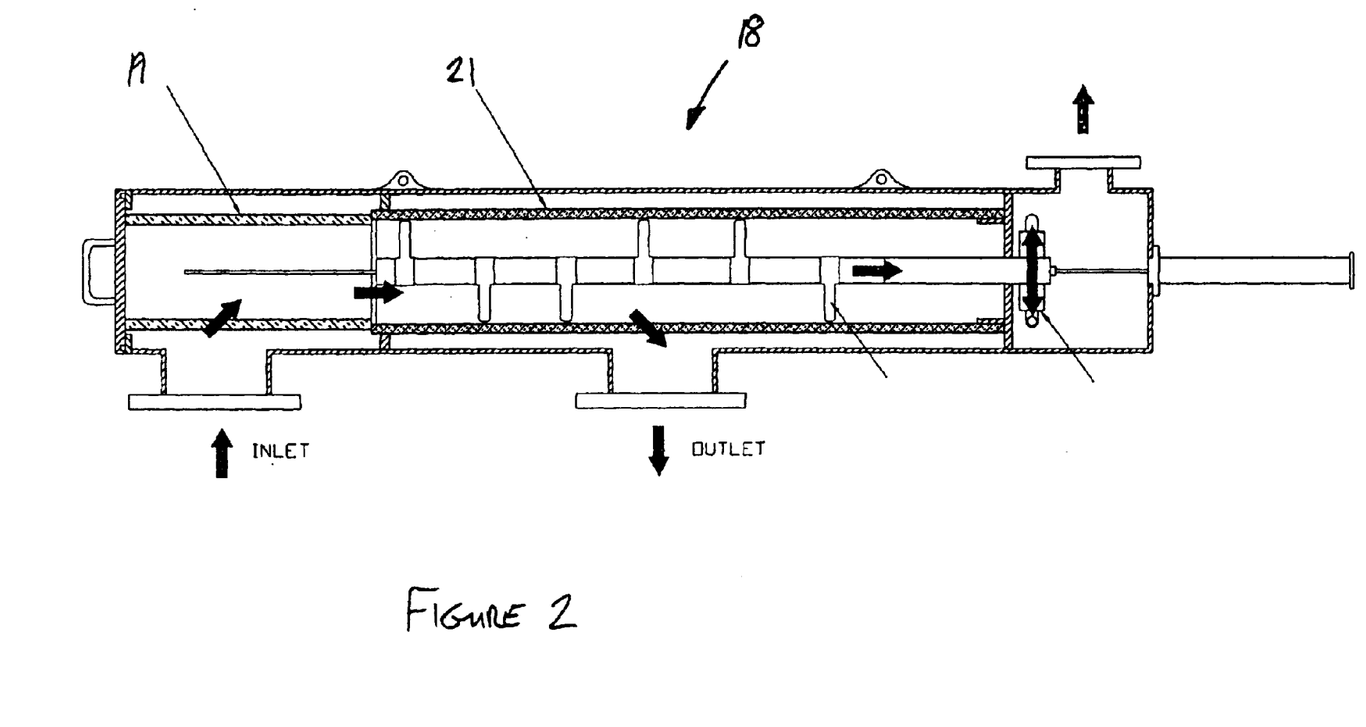
FIG. 2 is a cross-sectional side view of a filter usable in at least one embodiment of the desalination system.

In at least one embodiment, the desalination system 10 may include one or more filters 18 for removing contaminants from raw saltwater, as shown in FIG. 2. The filter 18 may be sized to remove suspended solids and other trash from the saltwater. In at least one embodiment, the filter 18 may be sized to remove suspended solids, biota, and other particles from the saltwater. In at least one embodiment, the filter 18 may be a strainer. The filter may include a coarse screen 19 and a fine screen 21. The saltwater processed by the desalination system 10 may be received from an ocean, bay, gulf, or other water body containing seawater, or may be taken from another source. In at least some embodiments of the desalination system 10 mounted to a vessel, raw saltwater may be drawn through one or more openings in a boat hull.

Figure 7:
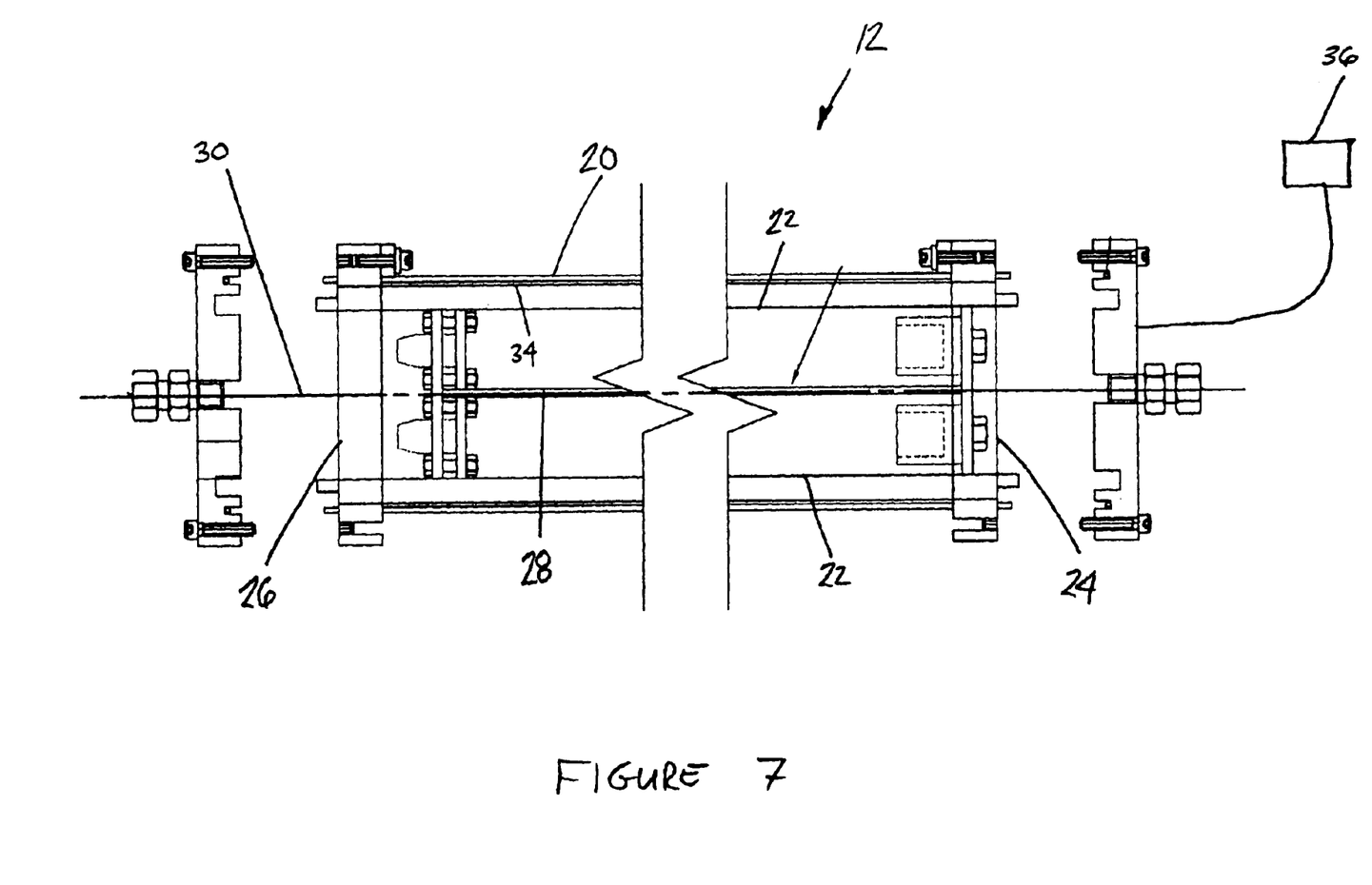
FIG. 7 is a cross-sectional side view of a chamber forming an ionized gas generator of this invention.
Figure 8:
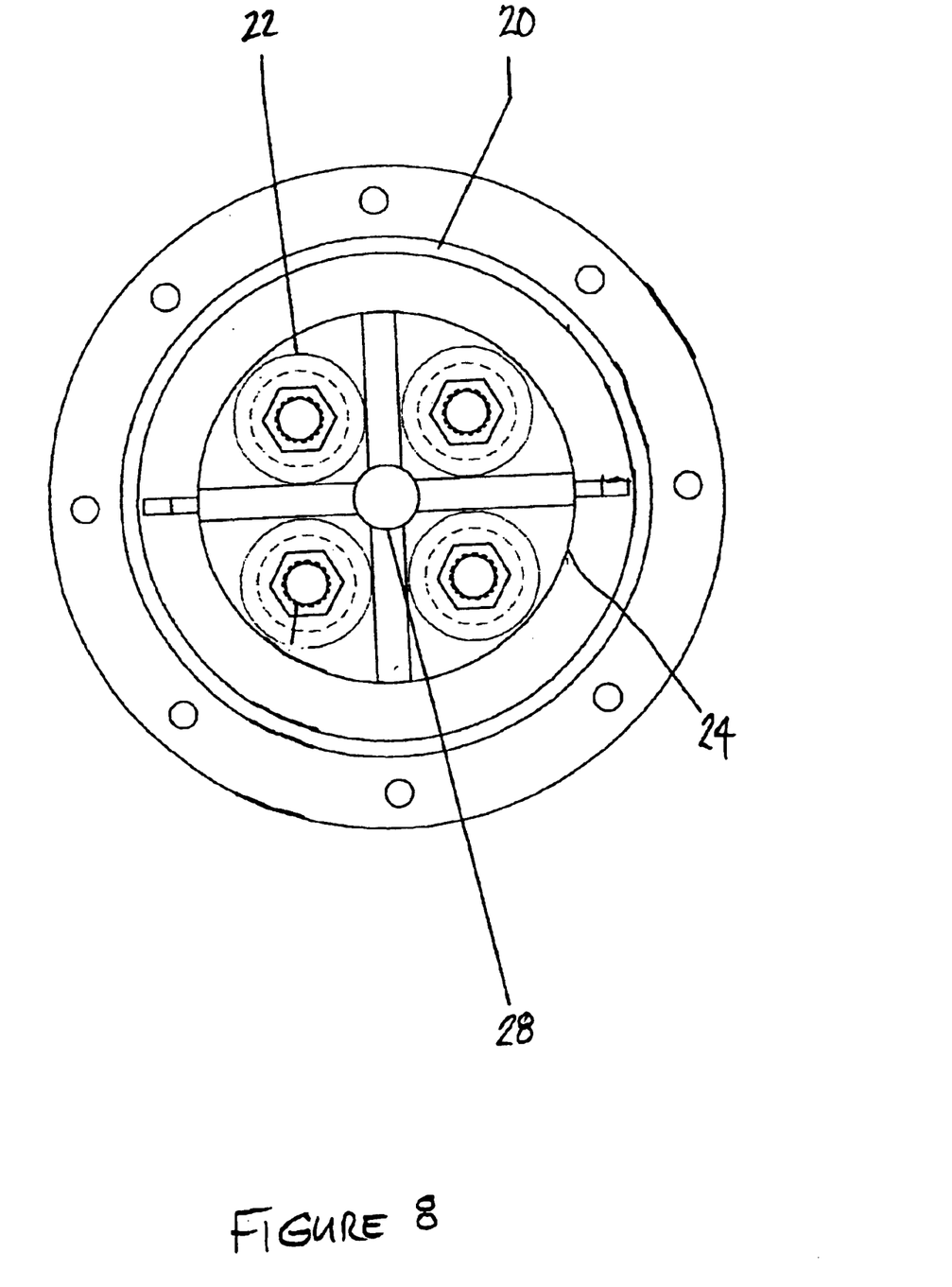
FIG. 8 is a cross-sectional bottom view of an inner assembly of at least a portion of the ionized gas generator.
Figure 9:
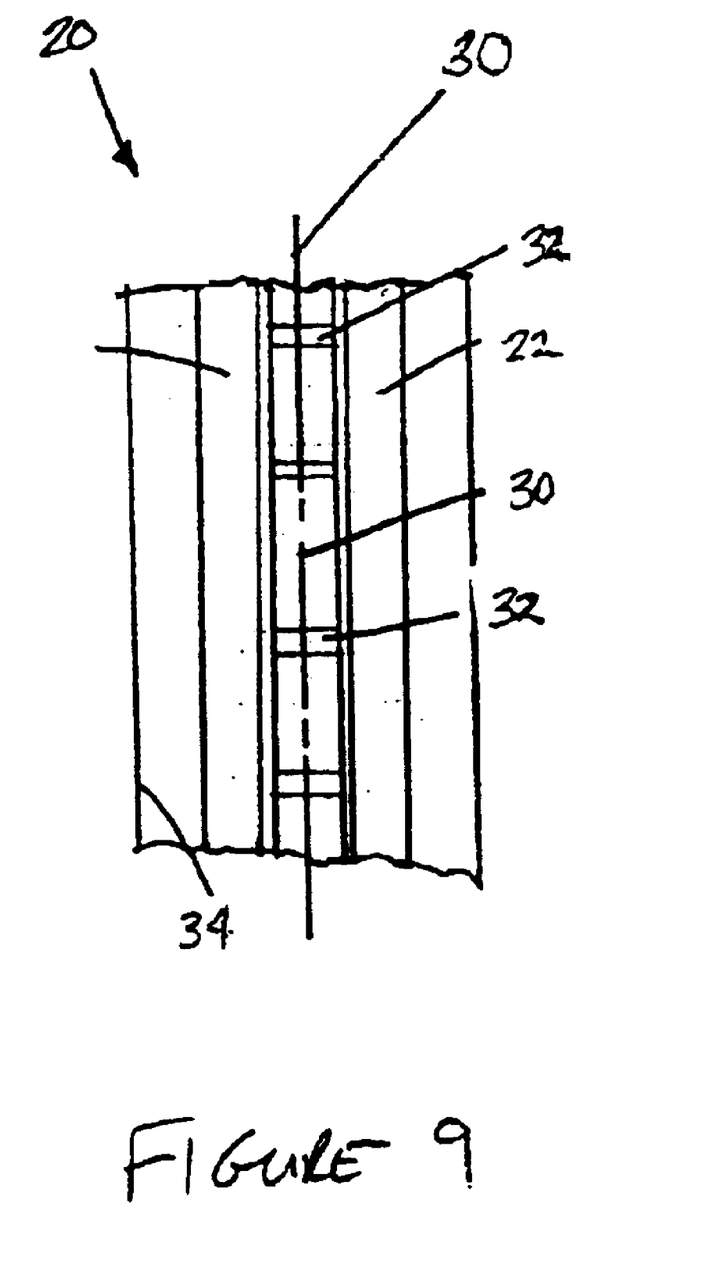
FIG. 9 is a partial cross-sectional view of a chamber of the ionized gas generator of this invention.

The desalination system 10 may also include one or more ionized gas injectors 15, as shown in FIG. 1, for injecting one or more ionized gases into the saltwater downstream of the filter 18. The desalination system 10 may also include one or more ionized gas generators 12, as shown in FIGS. 7–9, for supplying ionized gases to the ionized gas injectors 15. The basic components of the ionized gas generator 12 may form a device for confining a quantity of atmospheric air in a reaction zone in which the air is exposed to radiation from one or more ultraviolet lamp 22 and to a magnetic field in order to facilitate ionization of the highest possible percentage of the oxygen and nitrogen molecules in the passing airflow. The ultraviolet lamp 22 may emit ultraviolet radiation as well as wide bandwidth infrared radiation. In operation of at least one embodiment of the ionized gas generator 12, the ionized gas generator 20 exposes air to ultraviolet radiation in the presence of a magnetic field and ionizes a substantial portion of the oxygen and nitrogen in the air.

The ionized gas generator 12 may be formed from a plurality of chambers 20 containing one or more UV lamps 22. The ionized gas generator 12 may include between one lamp and about 20 lamps, with at least one embodiment having about eight lamps. The UV lamp 22 may be, but is not limited to, a low pressure mercury vapor ultraviolet lamp. In at least one embodiment, the ultraviolet lamps may have a wavelength between about 185 nm and about 255 nm. The chambers 20 may be, but are not limited to, generally cylindrical tubes sized and adapted to contain a plurality of UV lamps 22. The UV lamps 22 may extend from a first end 24 of the chamber 20 to a second end 26 of the chamber 20, which is generally opposite to the first end 24.

The ionized gas generator 12 may also have a plurality of magnets 28 positioned in the chambers 20. In at least one embodiment, the magnets 28 may be, but are not limited to, permanent magnets, such as rare earth magnets. The magnets 28, as shown in FIG. 9, may be positioned generally along a longitudinal axis 30 of a chamber 20. Each chamber 20 may include a plurality of magnets 28 stacked on top of each other using spacers 32 and oriented so that ends of adjacent magnets 28 have like polarity. Orientation of the magnets in this manner increases the width of the magnetic field produced by the magnets 28. In at least one embodiment, the width of the magnetic field may be at least as large as the distance between the magnets 28 and an inside surface 34 of the chamber 20. Passing air through the magnetic fields produced by the magnets and exposing the air to ultraviolet light reduces nitrogen and oxygen in the air and produces free oxygen and nitrogen.

The number of chambers 20 used in a particular application depends on the circumference and length of the chambers 20 and the anticipated fluid flow through the desalination system 10. In at least one embodiment, as shown in FIG. 7, the chambers 20 may have diameters that are about 15 centimeters and may be about 60 inches in length. In at least one embodiment, the chambers 20 may coupled together in parallel. The air flowing through the chamber 20 to be ionized may cool the ultraviolet lamps 22. In at least one embodiment, the air flow rate may be between about two cubic feet per minute (cfm) and about six cfm, depending on the circumference and length of the chambers 20. In one embodiment, the ionized gas generator 12 may have a flow rate of air through the generator 62 of about 2.5 cfm.

The ionized gas generator 12 may be driven using power supply 36. In at least one embodiment, the power supply 36 may be a solid state power supply providing pulsating bursts of current to the UV lamp 22 in which the pulsing current results in shorter and more intense UV energy being produced below 180 nm. The power supply 36 may provide pulsating electrical power that averages 90 volts at 250 milliamps and 60 Hz. The voltage and current may be controlled to periodically exceed these averages by about 30%. More particularly, by supplying power in a pulsated fashion to the UV lamp 22, the filaments forming the UV lamp 22 never cool fully but remain hot, such that a substantial portion of the total energy emitted by the UV lamp 22 is ultraviolet light of less than 180 nm wavelength. Low pressure mercury vapor lamps may be further stimulated by such pulsating current to emit a substantial fraction of increased short wavelength ultraviolet energy between about 160 nm and about 185 nm, emit other portions between about 250 nm and about 265 nm, and emit still other portions at wide bandwidth infrared energy. It is generally understood that ultraviolet radiation effectively stimulates ionization of oxygen, and nitrogen to a lesser degree, while infrared radiation stimulates ionization of nitrogen. Furthermore, exposure of atmospheric oxygen to radiation and magnetic fields increases the normal paramagnetism of oxygen molecules, thereby increasing the chemical activity of the chemical molecules.

A plurality of distinct ionic species may be produced in the ionized gas generator 12, each of which may contribute separately and beneficially to water treatment by oxidation and coagulation of contaminants, further resulting in disinfection as provided by the desalination system 10. In a first reaction, nitrogen molecules may be ionized and energized by ultraviolet or infrared radiation, or both, and are further energized by the surrounding magnetic fields, to generate ionized nitrogen and release a free electron according to the following equation:

$$[N{\equiv}N] \leftrightarrows N{=}N^+ + e^-$$

The ionized nitrogen gas thus, assists in coagulation of waterborne contaminant debris and particles, if any are present. Equally important, this reaction may release an additional free electron (e⁻), which may further assist in a variety of oxygen gas generation and ionization reactions.

A further reaction that may occur is the generation of singlet molecular oxygen ($O_2^{\alpha-}$) according to the following equation:

$$[O{=}O] \leftrightarrows O{-}O^- \leftrightarrows {}^\alpha O{-}O^{\alpha-}$$

This equation indicates that oxygen ions ($O_2^-$) and partially negatively charged dipoles ($O_2^{\alpha-}$). In other words, this equation indicated that a singlet molecular oxygen may be formed in the presence of pulsating ultraviolet radiation and magnetic fields provided by the desalination system 10. The negatively charged oxygen ions and partially charged singlet molecular oxygen stimulate coagulation, oxidation, or carboxylation, or any combination thereof, of any particulate debris or contaminants present, and may oxidize and destruct various contaminant species.

During operation, the ionized oxygen molecules may collide with one another, ozone ($O_3$) may be formed. Ozone is known to be highly reactive and destructive to organic molecules and therefore, may destroy organic molecules found in the saltwater. Polar combinations of two oxygen atoms and one nitrogen atom may also be formed. Such polar combinations may be useful in contributing to the destruction of organic contaminants as well. In addition, pulsating current to the UV lamp 22 to cause emission of additional UV photon radiation between about 160 nm and about 180 nm may result in the production of more highly paramagnetic oxygen ions.

The reduction potential for ionized gas according to the present invention is as follows:

Oxidizing Gas Species $$O_3 + 2H^+ + 2e^- \rightarrow O_2 + H_2O \quad 2.07 \text{ V};$$
$$H_2O_2 + 2H^+ + 2e^- \rightarrow 2H_2O \quad 1.32 \text{ V};$$

The ionized gas provides both a biological influence and an electromagnetic influence on the saltwater containing the electrolytically produced disinfectants and enhances the coagulation of the contaminants, the separation of solid particles, and the removal of contaminants.

The desalination system 10 may also include one or more mixers 40 for mixing one or more ionized gases with a saltwater, as shown in FIGS. 3–6. The mixer 40 may be positioned downstream of the filter 18. The mixer 40 may be any device suitable for containing saltwater and adequately mixing one or more ionized gases with the saltwater. The mixer 40 may be positioned downstream of the filter 18 and may receive ionized gases from a storage container, from one or more ionized gas generators, or from another suitable source. In at least one embodiment, the mixer 40 may be formed from an elongated housing 42 containing a plurality of injectors 44. The injectors 44 may be positioned around the perimeter of the housing 42 and offset relative to each other so as to form a helical formation. In at least one embodiment, the injectors 44 may be positioned in other configurations about the housing 42. The injectors 44 may be offset about 76 millimeters and rotated about 45 degrees relative to each adjacent injector 44.

Figure 3:
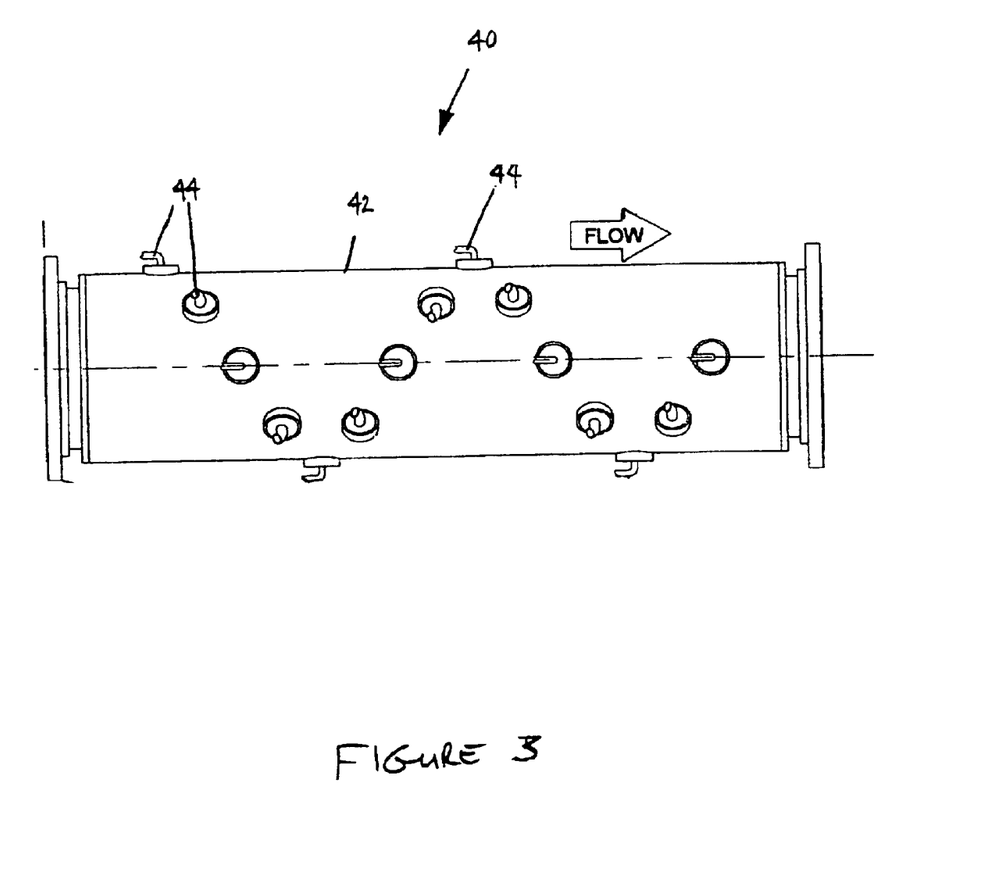
FIG. 3 is a side view of a mixer of this invention.
Figure 4:
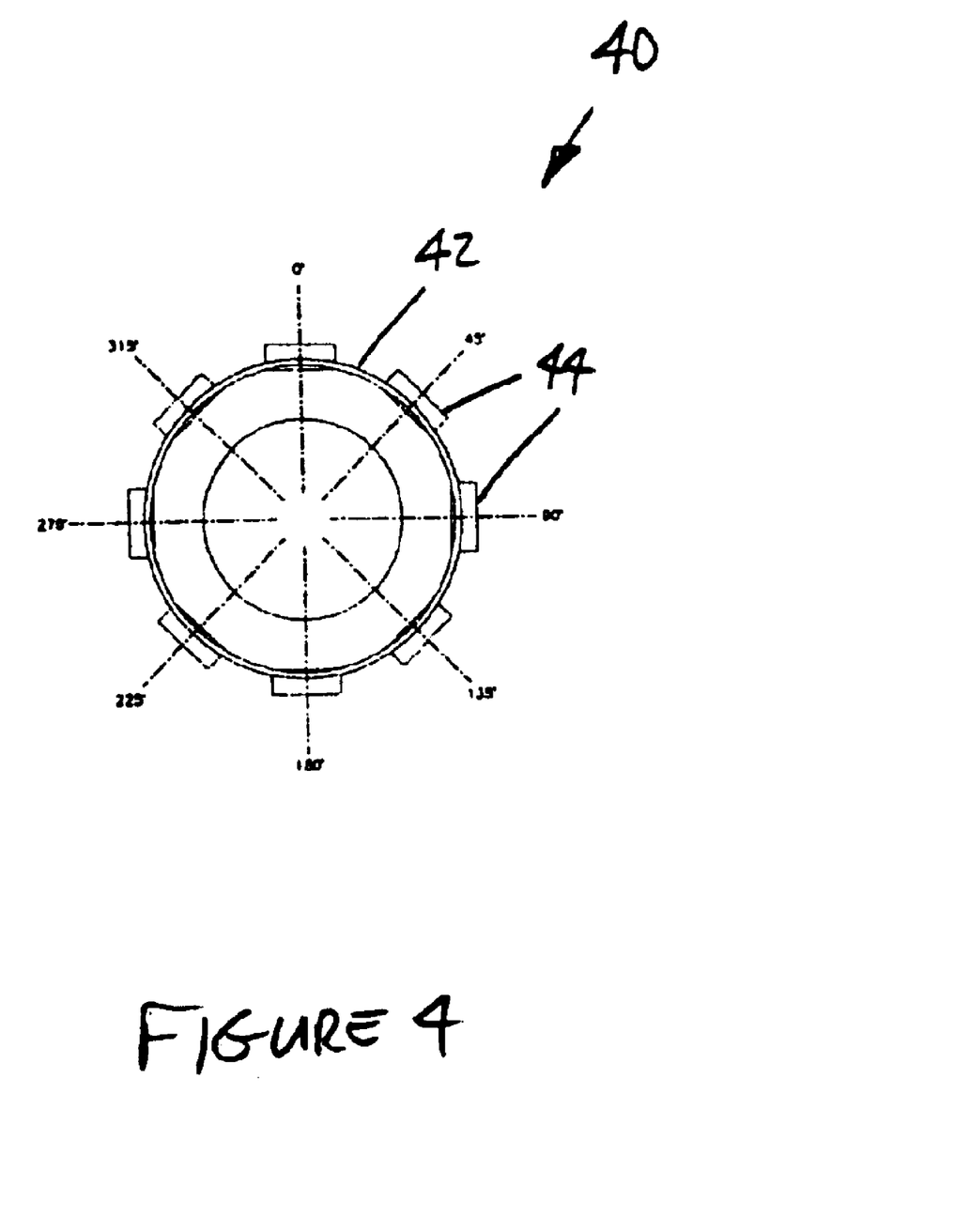
FIG. 4 is an end view of the mixer of FIG. 3.
Figure 5:
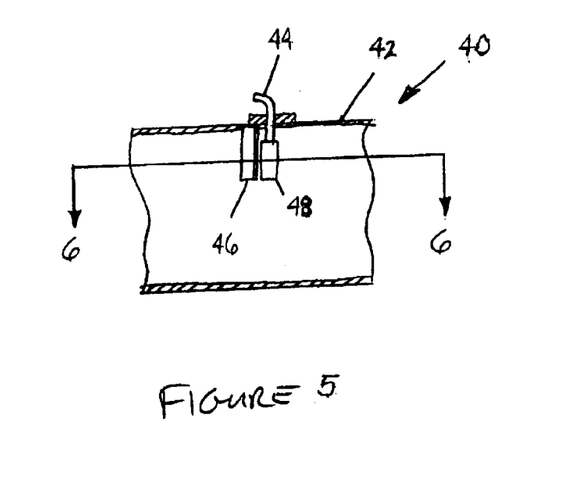
FIG. 5 is a cross-sectional top view of the mixer of FIG. 3.
Figure 6:
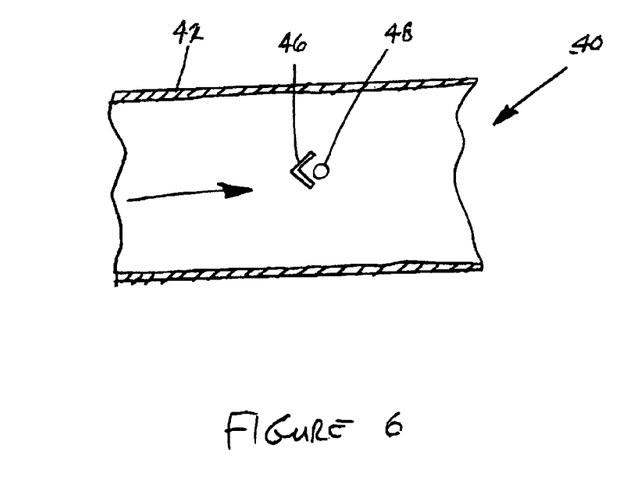
FIG. 6 is a cross-sectional side view of the mixer of FIG. 3.

In at least one embodiment, as shown in FIGS. 5 and 6, the injectors 44 may include a deflector 46 extending from the housing 42 into inner aspects of the mixer 40. In at least one embodiment, the deflector 46 may be formed from a V-shaped member. The injector 44 may also include a diffuser 48, which may be, but is not limited to, a stone, for diffusing a gas into a fluid contained in the mixer 40. The diffuser 48 may be adapted to emit a gas, such as an ionized gas. The ionized gas may be received from an ionized gas generator 12 or another source. The mixer 40 may include gaskets and bolt sleeves in appropriate locations to establish galvanic isolation between dissimilar metals to enhance the life of the mixer 40. In at least one embodiment, as shown in FIGS. 3 and 4, the mixer 40 may be generally cylindrical; however, in other embodiments, the mixer 40 may have other appropriate shapes.

In operation, one or more ionized gases diffuse into saltwater in the mixer 40. The resulting bubbles may have electrical charges. The bubbles attract organic components, such as, but not limited to, microorganisms, in the water that are oppositely charged relative to the bubbles. Surface tension of the bubbles holds microorganisms in suspension. Most microorganisms are not capable of surviving in a chamber of electrically charged bubbles and thus, many microorganisms die after being exposed to electrically charged bubbles.

Figure 14:
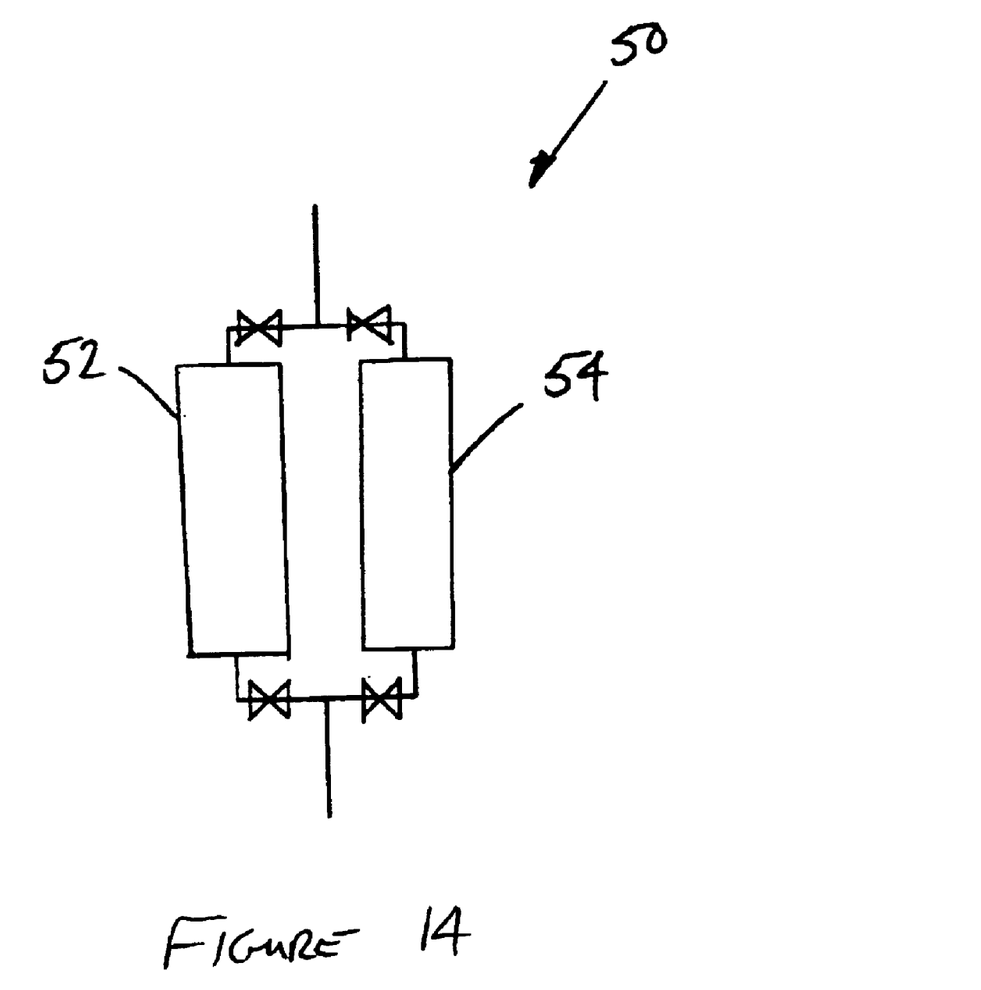
FIG. 14 is a schematic of a duplex filter of this invention.

The desalination system 10 may also include one or more filters 50 downstream of the mixer 40, as shown in FIG. 1. The filter 50 may be sized to remove biota, suspended solids, and materials that coagulated with the bubbles in the mixer 40. For instance, in at least one embodiment, the mixer 40 may be a 30 to 50 micron filter. The filter 50 may also consist of a multiple filter assembly. In at least one embodiment, the filter 50 may be formed from two filters 52, 54 as shown in FIG. 14. The duplex filters 52, 54 may be positioned in parallel, thereby enabling one or both of the filters 52, 54 to be used simultaneously. In the event one of the filters 52, 54 needs to be replaced, a series of valves may be actuated to isolate one of the filters 52, 54 to be replaced while enabling the remaining filter 52, 54 to be used.

The desalination system 10 may also include one or more disinfectant injectors 60 for injecting one or more disinfectants into the saltwater. The disinfectant injector 60 may receive one or more disinfectants from a storage container, a disinfectant generator 14, or other appropriate source. The disinfectants may be, but are not limited to, chlorine, bromine, and other appropriate disinfectants.

The desalination system 10 may include one or more disinfectant generators 14. In embodiments including a disinfectant generator 14, a disinfectant storage tank is not required, but may be used if desired. Thus, the disadvantages associated with a storage tank filled with disinfectants may be eliminated when using a disinfectant generator. The disinfectant generator 14 may be capable of generating one or more disinfectants from saltwater. The saltwater may be drawn from the water in which a vessel is floating.

Figure 10:
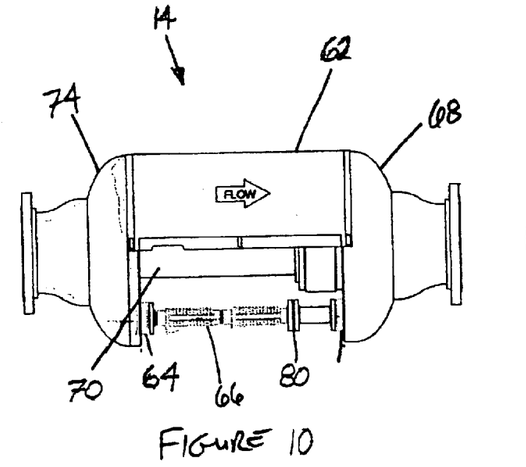
FIG. 10 is a cross-sectional side view of a disinfectant generator of this invention.
Figure 11:
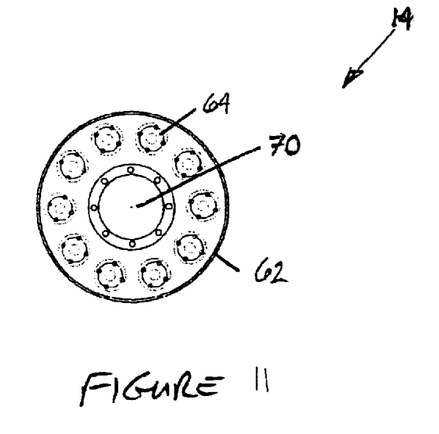
FIG. 11 is an end view of the disinfectant generator.
Figure 12:
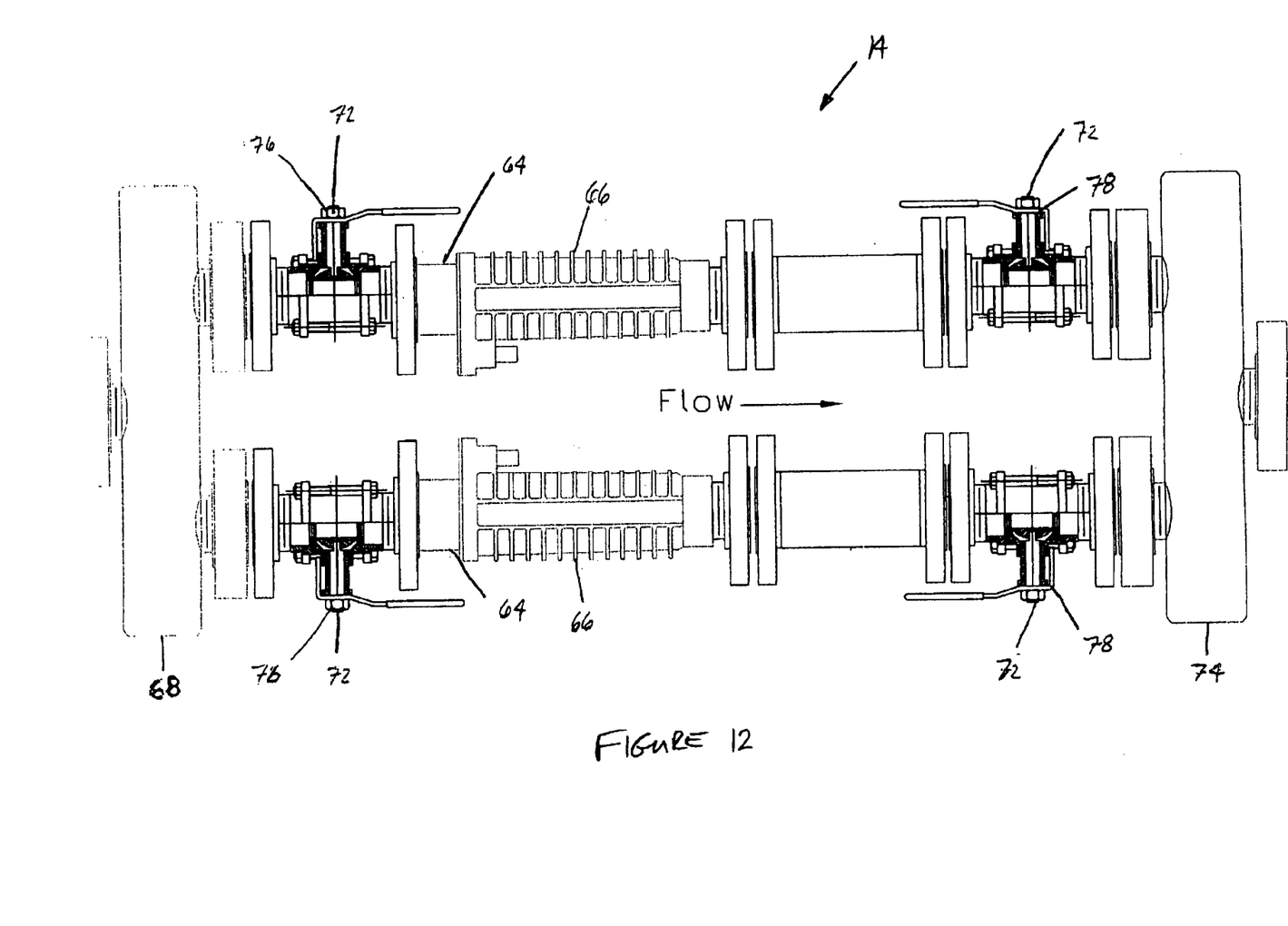
FIG. 12 is a side view of conduits forming a portion of the disinfectant generator of this invention.

In at least one embodiment, as shown in FIGS. 10–12, the disinfectant generator 14 may be formed from a housing 62 containing one or more conduits 64 having electrical cells 66 for emitting electricity into the water flowing through the conduits 64. The housing 62 may be generally cylindrical or have another appropriate shape for containing the conduits 64. Likewise, the conduits 64 may be cylindrical or have another appropriate shape. The number of conduits 64 contained in the housing 62 may vary, but in at least one embodiment, housing 62 may contain between four conduits and thirty conduits, and in at least one embodiment, may contain about twenty conduits.

The housing 62 may also include a header 68 for distributing saltwater to the plurality of conduits 64. In addition, the disinfectant generator 14 may also include a bypass conduit 70 for controlling the flow of fluid through the conduits 64. In at least one embodiment, one or more valves 72, as shown in FIG. 12, may be attached to the conduit 64 for regulating flow of fluids through the disinfectant generator 14. Each conduit 64 of the disinfectant generator 14 may operate efficiently at a flow rate between about 5 gallons per minute (gpm) and about 40 gpm. Excess flow may be passed through the bypass conduit 70. The fluids passing through the bypass conduit 70 and the fluids passing through the conduits 64 mix in the header 74 before flowing to downstream components of the water treatment system 10.

One or more of the conduits 64 may have a valve 76 on an upstream side and a valve 78 on a downstream side of the electrical cell 66 for controlling fluid flow through the electrical cell 66 and enabling replacement of an electrical cell 66 without having to shutdown the entire system during the replacement. One or more of the conduits 64 may have one or more electrical cells 66. The electrical cells 66 may emit an electrical current into the saltwater, which promotes electrolysis. Electrolysis may break the bonds in various compounds and produce free halides, such as but not limited to, chlorine and bromine, in liquid form. The reduction potential for saltwater electrolysis may be as follows:

(1) Electrolysis of Water $$O_2+4H^++4e^-\rightarrow 2H_2O\ 1.229\ V;$$

(2) Potential Halide Reactions $$Cl_2+2e^-\rightarrow 2Cl^-\ 1.358\ V;$$

$$Br_2+2e^-\rightarrow 2Br^-\ 1.065\ V;$$

The disinfectant generator 14 may be capable of producing halides, such as chlorine, in a concentration of between about 0.5 parts per million (ppm) and about 20 ppm. The desired amount of disinfectant produced is a concentration large enough to remove biota and other contaminants from the water and have residual concentrations of the chlorine left over.

The disinfectants may be collected and sent to a conduit carrying contaminated fluids. Byproducts produced by this process may be returned to the sea or other body of water, or returned to another location. The components of the disinfectant generator 14 may be formed from materials, such as, but not limited to, stainless steel, such as stainless steel 316L schedule 40. One or more of the conduits 64 may include one or more sensors 80 for measuring salinity, pressure, temperature, and other system parameters. Sensor 80 is depicted as a tube in FIG. 10 and 12; however, sensor 80 is not limited to this configuration. The disinfectant generator 14 may also include a water leak detector, which may send an alert signal in the even of internal piping failure to prevent catastrophic results. A petcock (not shown) may also be included in the housing 62 for manual viewing of the internal aspects of the disinfectant generator 14.

Figure 13:
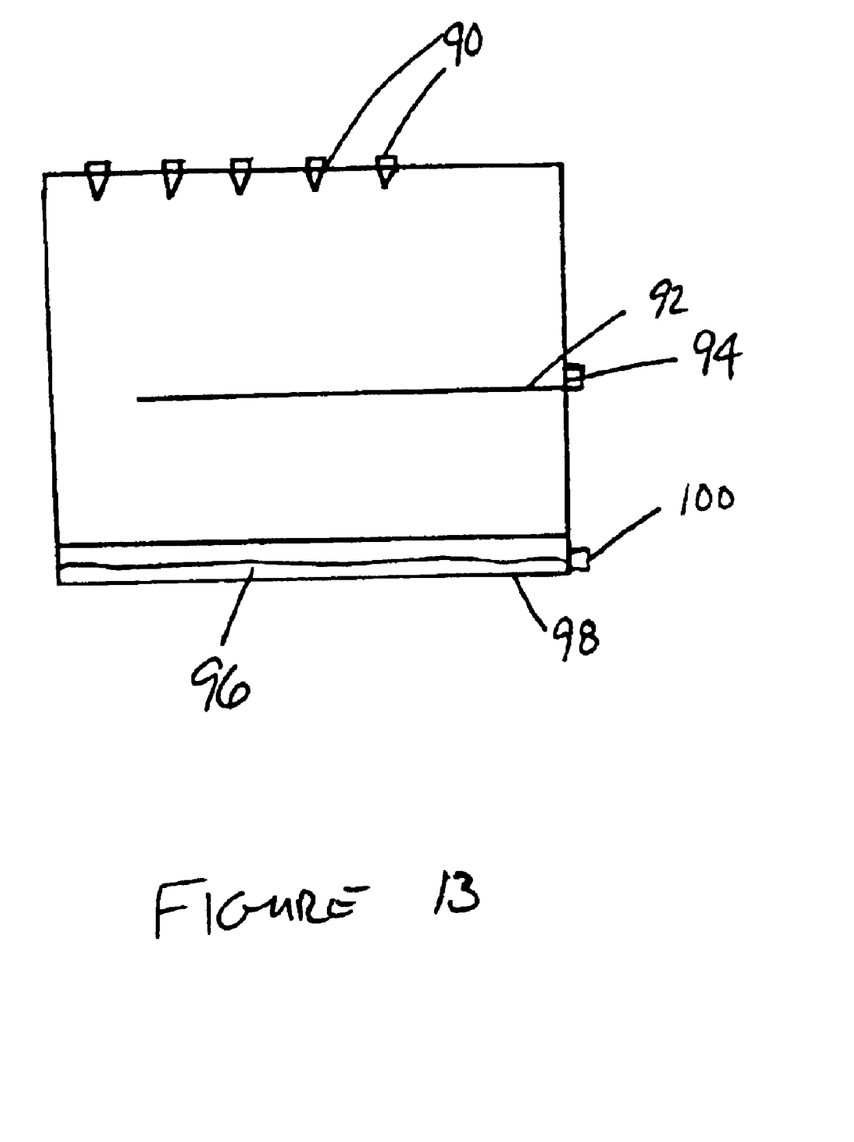
FIG. 13 is a cross-sectional side view of a reaction chamber of this invention.

The desalination system 10 may also include one or more reaction chambers 16, as shown in FIGS. 1 and 13, for mixing one or more disinfectants with the mixture of ionized gas and saltwater. The reaction chamber 16 may facilitate separation of the salt from the saltwater and form desalinated water. The salt removed from the saltwater may be collected to form a salt slurry. The reaction chamber 16 is not limited to a particular design. Instead, any device capable of separating salt and other contaminants from saltwater may be used. In at least one embodiment, evaporators, such as those produced by Alfa Laval of Tumba, Sweden, may be used.

In at least one embodiment, the reaction chamber 40 may include one or more nozzles 90 adapted to emit a fine spray of the mixture of saltwater, disinfectants, and ionized gas into the reaction chamber 40. In at least one embodiment, the nozzles 90 may be fogging nozzles, such as, but not limited to, those nozzles commonly used in fire prevention systems to cool a fire rather than extinguish the fire. In at least one embodiment, the reaction chamber 16 may operate under a slight vacuum, which may be about 0.9 Pa, and at a temperature slightly less than the boiling point of saltwater.

Upon passing through the nozzles 90 and entering the reaction chamber 16, the saltwater may be separated into salt (NaCl) and a mixture of water and disinfectants as a result of passing through the disinfectant generator 35, which causes separation of bromine salts and chlorine salts into chlorine/bromine and sodium. The sodium remains in solution while the chlorine and bromine are separated from the solution in an unstable form but act as excellent disinfectants. Because of the instability of the chlorine and bromine, the chlorine and bromine may attempt to reunite with the sodium to form a slurry once the electrical charge is removed.

Due to the temperature and pressure variables maintained within the reaction chamber 16, the water may be distilled off of the salt, which may be in the form of a slurry at the bottom of the reaction chamber 16. The water may be in vapor form and may be cooled and condensed near the top of the reaction chamber 16. The reaction chamber 16 may include a baffle 92 for collecting the water to be pumped out of the reaction chamber 16 through an outlet 94. Similarly, the salt slurry 96 may be removed from the bottom 98 of the reaction chamber 16 through an outlet 100. The salt slurry 96 may be in a form that allows the slurry 96 to be pumped out of the reaction chamber 16 and back into the sea. Utilization of ionized gas and utilization of finely filtered water in mist form within the reaction chamber 16 reduces the scaling phenomenon normally associated with conventional desalination chambers. Consequently, the desalination system 10 and more particularly, the reaction chamber 16, requires less frequent cleaning and more efficiently desalinates water in comparison with conventional desalination systems.

During operation of the reaction chamber 16, the nozzle 90 may remain relatively obstruction free due to upstream filtering. As such, the clean saltwater passing through the nozzle 90 is not prone to clog the nozzle 90. Introduction of the saltwater into the reaction chamber 16 as a fog or mist increases efficiency of the reaction chamber 16 for separating the salt slurry 96 from the saltwater. The number and arrangement of nozzles 90 may be such as to maximize desalination in accordance with other factors such as, but not limited to, water salinity, reaction chamber temperature, and reaction chamber pressure. Of course, other types of nozzles 90 may be used as will be recognized by those of skill in the art to achieve the described desired result.

During operation of the desalination system 10, a saltwater, which may be drawn from a water body in which a vessel is floating, drawn from a container, or drawn from another source, may be passed through a filter 18 to remove relatively large suspended solids. One or more ionized gases may be injected into the saltwater flowing from the filter 18. The ionized gas may be drawn from a container or may be generated using one or more ionized gas generators 12. In at least one embodiment, one or more ionized gases may be generated by the ionized gas generator 12 and mixed with saltwater in a mixer 40 forming a mixture of ionized gases and saltwater. The ionized gases may kill living organisms in the saltwater. The mixture of saltwater and ionized gases may flow into a filter 50, which may be sized to remove suspended solids, organisms killed in the mixer 40, and other contaminants.

The mixture may then be mixed with one or more disinfectants to further kill living organisms present in the saltwater and to facilitate separation of the salt from the saltwater in the reaction chamber 16. The disinfectants may be drawn from a container or may be generated using one or more disinfectant generators 14. The disinfectant generator 14 may generate disinfectants from saltwater using electrolysis. Adding a disinfectant to the mixture of saltwater and ionized gases forms a mixture of saltwater, ionized gases, and a disinfectant.

The mixture of the saltwater, ionized gases, and disinfectant may then be sent to a reaction chamber 16 to remove at least a portion of the salt from the saltwater. The mixture may be injected into the reaction chamber 16 through one or more nozzles 90. In at least one embodiment, the nozzles 90 may produce a fine mist or fog of the mixture. The fine mist or fog may cause salt to settle out and form a salt slurry 96 at the bottom 98 of the reaction chamber 16. The water may be collected on one or more baffles 92 for removal of the desalinated water. The desalinated water may then used as potable water.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A system for desalinating water, comprising:
    at least one mixer for mixing saltwater with at least one ionized gas to produce a mixture of ionized gas and saltwater;
    at least one filter for removing coagulated particles from the mixture of ionized gas and saltwater;
    at least one disinfectant generator for generating a disinfectant from a saltwater; and
    at least one reaction chamber for mixing the disinfectant with the mixture of ionized gas and saltwater, wherein the mixture of saltwater and ionized gas is separated into a salt slurry and desalinated water.

2. The system of claim 1, wherein reaction chamber further comprises at least one fogging nozzle for delivering the mixture of ionized gas and saltwater to the at least one reaction chamber.

3. The system of claim 1, further comprising at least one filter upstream of the mixer.

4. The system of claim 3, wherein the at least one filter upstream of the mixer comprises a strainer.

5. The system of claim 1, at least one filter for removing coagulated particles comprises a between about a 30 micron filter and about a 50 micron filter.

6. The system of claim 1, wherein the at least one reaction chamber operates at a negative internal pressure.

7. The system of claim 1, further comprising an ionized gas generator for providing ionized gas to the at least one mixer.

8. The system of claim 7, wherein the ionized gas generator includes a gas pathway for exposing a gas to ultraviolet radiation and to a magnetic field as the gas is passed through the ionized gas generator.

9. The system of claim 7, wherein the ionized gas generator is formed from a plurality of chambers, each chamber containing at least one ultraviolet lamp and each chamber adapted to allow a gas to pass the through the ionized gas generator.

10. The system of claim 9, wherein the plurality of chambers are coupled in parallel.

11. The system of claim 1, wherein the at least one filter is comprised of a polarizable filtration medium having finely-divided particles of glass and polarizable ceramics.

12. The system of claim 1, wherein the disinfectant generator comprises a housing containing a plurality of conduits having electrical cells for exposing electricity to saltwater flowing through the conduits.

13. The system of claim 12, wherein the disinfectant generator further comprises a single inlet coupled to a header that distributes saltwater to the plurality of conduits and at least one of the conduits has a valve upstream of an electrical cell and a valve downstream of the electrical cell.

14. The system of claim 13, wherein the disinfectant generator further comprises at least one sensor positioned downstream of an electrical cell in at least one of the plurality of conduits.

15. The system of claim 13, wherein the disinfectant generator further comprises at least one bypass conduit for controlling flow of saltwater through the conduits of the disinfectant generator.

16. A system for desalinating water, comprising:
    at least one ionized gas injector for injecting at least one ionized gas into saltwater to produce a mixture of ionized gas and saltwater;
    at least one filter for removing coagulated particles from the mixture of ionized gas and saltwater;
    at least one disinfectant injector for injecting at least one disinfectant into the saltwater; and
    at least one reaction chamber for mixing the disinfectant with the mixture of ionized gas and saltwater, wherein the mixture of saltwater and ionized gas is separated into a salt slurry and desalinated water.

17. The system of claim 16, wherein reaction chamber further comprises at least one fogging nozzle for delivering the mixture of ionized gas and saltwater to the at least one reaction chamber.

18. The system of claim 16, further comprising at least one mixer for mixing saltwater with at least one ionized gas from the at least one ionized gas injector to produce a mixture of ionized gas and saltwater.

19. The system of claim 16, further comprising at least one filter upstream of the mixer.

20. The system of claim 16, at least one filter for removing coagulated particles comprises a between about a 30 micron filter and about a 50 micron filter.

21. The system of claim 16, further comprising an ionized gas generator for providing ionized gas to the at least one mixer.

22. The system of claim 21, wherein the ionized gas generator includes a gas pathway for exposing a gas to ultraviolet radiation and to a magnetic field as the gas is passed through the ionized gas generator.

23. The system of claim 21, wherein the ionized gas generator is formed from a plurality of chambers, each chamber containing a plurality of ultraviolet lamps and each chamber adapted to allow a gas to pass the through the ionized gas generator.

24. The system of claim 16, wherein the at least one filter is comprised of a polarizable filtration medium having finely-divided particles of glass and polarizable ceramics.

25. The system of claim 16, further comprising a disinfectant generator formed from a plurality of conduits having electrical cells for exposing electricity to saltwater flowing through the conduits.

26. The system of claim 25, wherein the disinfectant generator further comprises a single inlet coupled to a header that distributes saltwater to the plurality of conduits and at least one of the conduits has a valve upstream of an electrical cell and a valve downstream of the electrical cell.

27. The system of claim 25, wherein the disinfectant generator further comprises at least one bypass conduit for controlling flow of saltwater through the conduits of the disinfectant generator.

28. A method of converting saltwater to desalinated water, comprising:

passing saltwater to a mixer where at least one ionized gas is mixed with the saltwater to create a mixture of saltwater and ionized gas;

passing the mixture of saltwater and ionized gas into at least one filter to remove at least a portion of coagulated particles from the mixture;

mixing the mixture of saltwater and ionized gas with at least one disinfectant to produce a mixture of saltwater, ionized gas, and at least one disinfectant;

passing the mixture of saltwater, ionized gas, and at least one disinfectant into a reaction chamber, whereby substantially all of the salt is removed from the mixture and forms a salt slurry and the remaining water is desalinated water.

29. The method of claim 28, further comprising passing saltwater through at least one filter upstream of the mixer.

30. The method of claim 28, further comprising generating at least one ionized gas.

31. The method of claim 30, wherein generating at least one ionized gas comprises exposing air to ultraviolet radiation and a magnetic field.

32. The method of claim 31, wherein generating at least one ionized gas comprises passing air through at least one chamber containing a plurality of ultraviolet lamps surrounding a plurality of magnets forming an electrical field, wherein the magnets are positioned so that adjacent ends of adjacent magnets have like polarity.

33. The method claim 28, further comprising generating at least one disinfectant and mixing the at least one disinfectant with saltwater.

34. The method of claim 33, wherein generating at least one disinfectant comprises passing saltwater through one or more chambers in which electricity is passed through the saltwater.

* * * * *